7355X
N. C. Millett,
Bread Machine,
Patented Dec. 28, 1832.
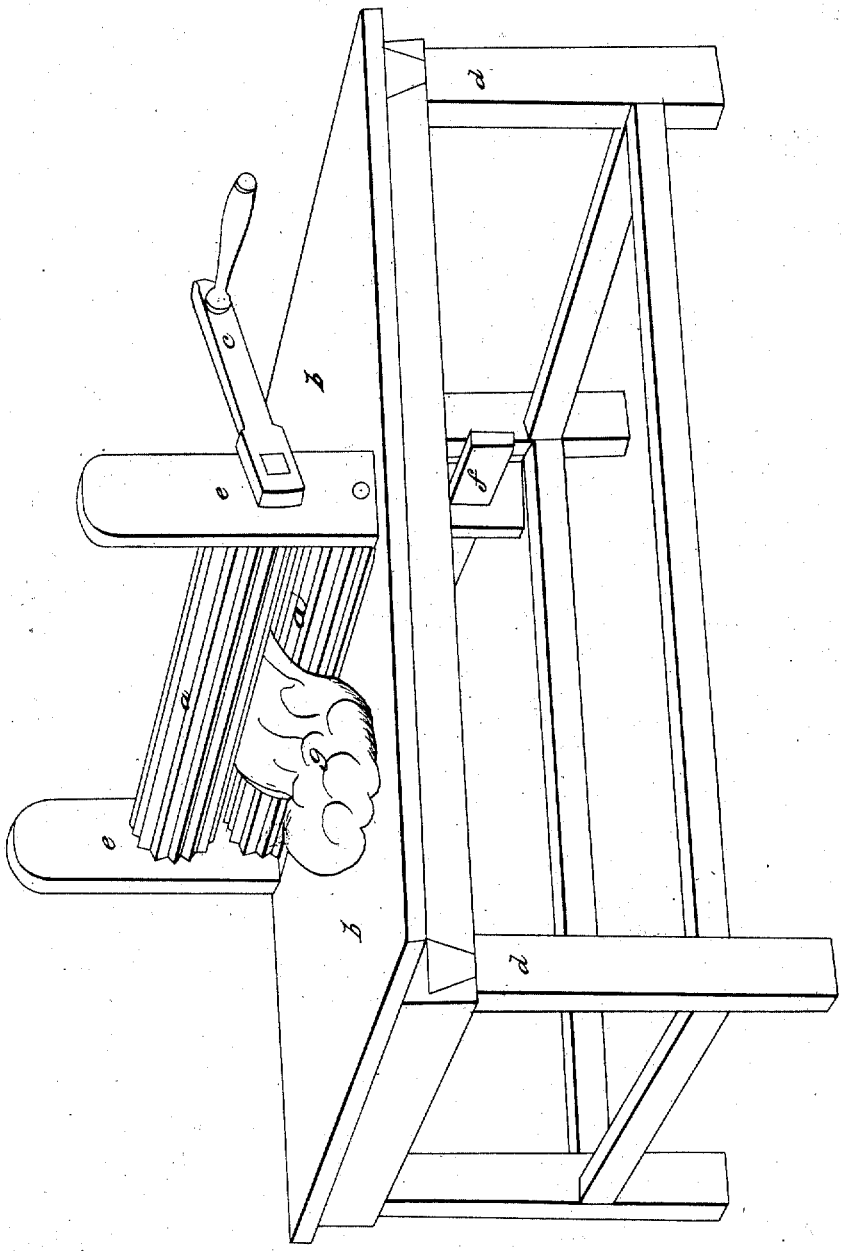
N. PETERS, PHOTO-LITHOGRAPHER, WASHINGTON, D. C.

7355X Dec. 28. 1832

Nimrod C. Willett of Jonesborough Tennessee
Letters Patent

The Schedule referred to in these Letters Patent and making part of the same containing a description in the words of the said Nimrod C. Willett himself of his improvement in the machine for Kneading Dough.

To all to whom these Presents shall come, Be it Known that I, Nimrod C. Willett of the Town of Jonesborough in the County of Washington and State of Tennessee, have invented a new and useful improvement for Kneading Dough and that the following is a full and exact description of the construction and operation of the said machine as invented by me to wit, Fluted [illegible] placed one above the other in upright Standards at each side of the table: the leaves of which are placed near to the lower roller or [illegible], with a gudgeon to extend through one of the uprights with a crank or handle by which the upper [illegible] is revolved and thereby the dough is compressed between it and the lower one and carried through in the direction in which the rollers or [illegible] are turned and thus compressed between the [illegible], thrown upon the leaf at the opposite side from whence it enters.

The table upon the sides of which the uprights are affixed is of the ordinary construction except that the legs are both inserted by tenons and dovetail, and the uprights confined by a key extending the whole width of the table frame.

Witnesses
John Blair
Wm Boyce

Nimrod C. Willett (276 words)